March 4, 1969     P. J. SAUTIER     3,430,562
AIRCRAFT BOMB
Filed Nov. 8, 1967
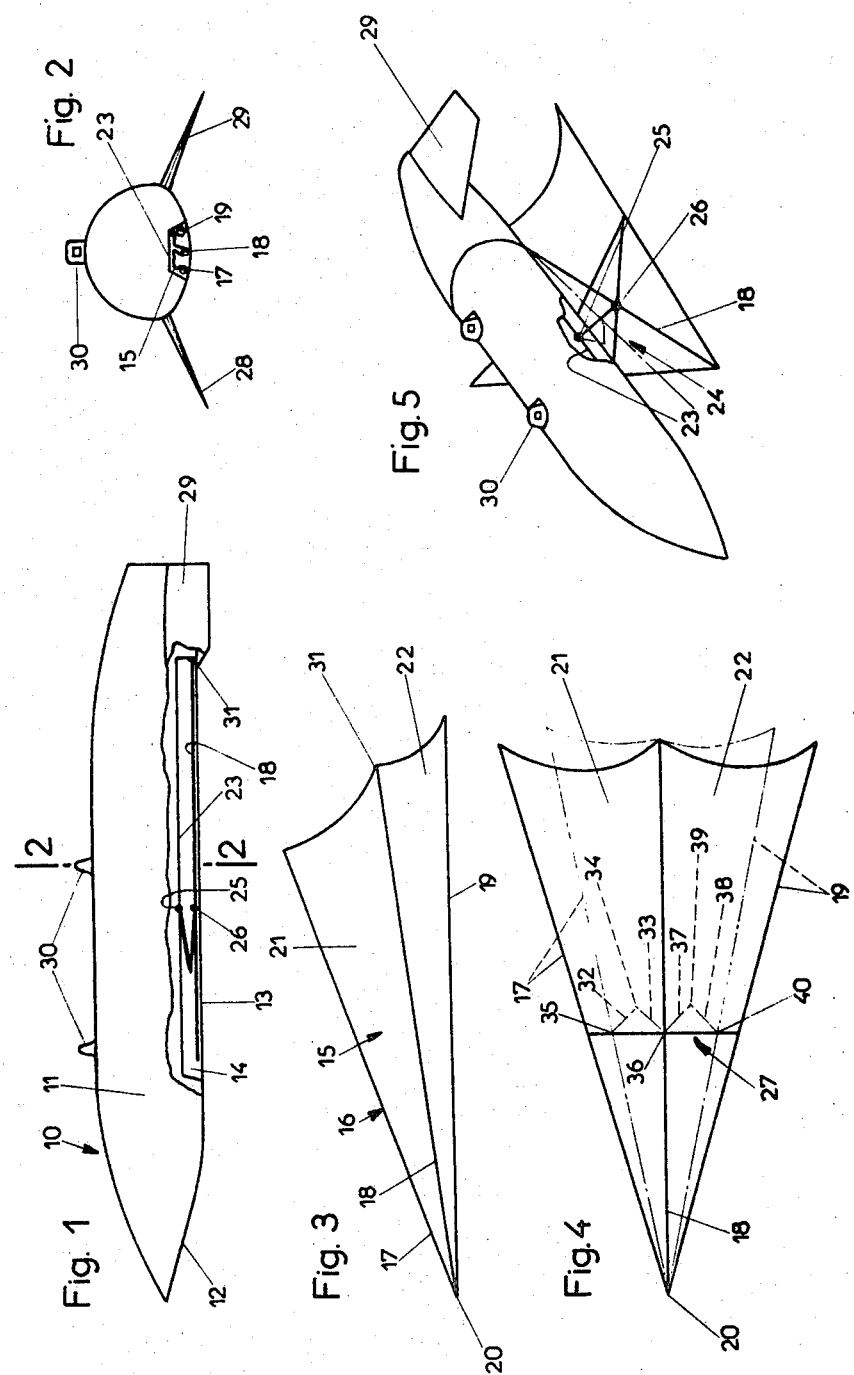

United States Patent Office 3,430,562
Patented Mar. 4, 1969

3,430,562
AIRCRAFT BOMB
Pierre Jean Sautier, Paris, France, assignor to Engins
Matra, Paris, France
Filed Nov. 8, 1967, Ser. No. 681,388
Claims priority, application France, Nov. 10, 1966,
83,211
U.S. Cl. 102—4    4 Claims
Int. Cl. F42b 25/06

ABSTRACT OF THE DISCLOSURE

An aircraft bomb comprising a bomb body suspended at its top from an aircraft and having a collapsible wing retracted into a housing therein until the bomb is released, at which time the wing pivots about an axle at its rear end to drop to an inclined position, with respect to the longitudinal axis of the bomb, which is limited by a foldable coupling such that when the wing is extended from the housing to its limited position a diving force is produced by aerodynamic airflow.

---

The invention relates to an aircraft bomb.

It is an object of the invention to provide a bomb which, when released from an aircraft at low altitude, has a high power of penetration.

It is also an object of the invention to provide such a bomb which is as simple to use as a regular bomb and does not involve modification of the devices for support and for release which are provided in the aircraft.

An aircraft bomb according to the invention is characterized in that it is provided with a wing, retracted as long as the bomb is not released and which, when it is extended, causes the bomb to dive towards the ground.

According to the invention, also, use is made, for this purpose, of a triangular wing, known per se.

In the description, which follows, given by way of example, reference is made to the accompanying drawing, in which:

FIGURE 1 is a diagrammatic view in side elevation, and partially broken away, of a bomb according to the invention;

FIGURE 2 is a sectional view taken along line 2—2 of FIGURE 1;

FIGURE 3 is a perspective view of a wing of a bomb according to the invention;

FIGURE 4 is a plan view of the wing in spread out condition; and

FIGURE 5 is a perspective view of the bomb after release.

The aircraft bomb 10, according to the invention, comprises a streamlined body 11 having advantageously in the front, at the lower part, a flat part 12, to avoid a ricochet on impact.

In the lower part 13 of the bomb is provided a housing 14, in which is placed a wing 15 in folded condition.

The latter comprises a framework 16, constituted by three struts 17, 18, 19, hinged around a common apex 20. The central strut 18 is mounted pivotally by its rear end 31 on the body of the bomb. A flexible sheet 21, of triangular form, is fixed by its long sides, respectively, to the struts 17 and 18 and a similar flexible sheet 22 is fixed by its long sides to the struts 18 and 19, respectively.

Between the upper base 23 of the housing 14 and the strut 18 is interposed a triangulation device 24 hinged at its ends 25 and 26, respectively, on the base 23 and the strut 18.

A triangulation device 27 is interposed between the struts 17 and 19 and the middle strut 18. It comprises two arms 32 and 33 (FIG. 4) hinged to one another at 34 at one of their ends, while their other ends are hinged at 35 and 36, respectively, on the strut 17 and the strut 18, as well as two arms 37 and 38 hinged to one another at 39 and hinged at 36 and 40, respectively, on the strut 18 and the strut 19.

The body of the bomb 11 carries at its rear end tail units 28 and 29. The body can be suspended from the aircraft by one or more eyes 30.

When the bomb is released, for example from an aircraft flying at very low altitude and at high speed, the wing 15 extends from the body of the bomb by pivoting around the rear axis 31 when maintaining means (not shown) of the wing 15 in the housing 14 have been released. The triangulation device 24 opens until its sides come substantially into prolongation one with the other and advantageously in locked condition. The struts 17 and 19 which, in the retracted condition of the wing were adjacent strut 18 (FIG. 2), move apart from the latter by rotation around the apex 20 until complete opening of the triangulation device 27 is achieved. The areodynamic forces exerted on the spread-out wing cause the bomb to dive; when the bomb makes contact with the ground, it has maintained a high speed and its longitudinal axis makes a considerable angle with the ground. The power of penetration of the bomb is therefore high.

What is claimed is:

1. An aircraft bomb comprising a body having means for suspension from an aircraft, a wing mounted on said body in diametric opposition to said suspension means, means connecting said wing to said body for pivotal movement about a transverse axis, said wing having a retracted position relative to said body with the bomb suspended from the aircraft and being freed upon release of the bomb, said wing having a generally V-shape in the released position and lying beneath the body over a substantial portion of the length thereof, and means connecting the wing to said body at a location remote from said axis to limit the pivotal movement of said wing about said axis and cause the wing to assume a generally forwardly and downwardly inclined position relative to the body wherein the apex of the V-shape of the wing is pointed forwardly whereby aerodynamic airflow produces a diving force on the wing and thereby on the body.

2. A bomb as claimed in claim 1 wherein said body has a housing for receiving the wing in said retracted position, said wing having a middle strut with a rearward end, said means which connects the wing to said body for pivotal movement comprising a hinge connecting said housing with said middle strut at its rearward end, said means for limiting the pivotal movement of the wing comprising a foldable coupling between said housing and said middle strut at a location forward of said hinge, said coupling having a collapsed position when the wing is retracted in said housing and an extended position.

3. A bomb as claimed in claim 2 wherein said wing further comprises a pair of lateral struts having forward ends hingeably connected to said middle strut at the front end thereof and means for pivotably moving the lateral struts relative to said middle strut to close said wing in the retracted position thereof and open the wing when the body is released.

4. A bomb as claimed in claim 2 wherein said body further comprises a fixed tail unit having transverse members.

References Cited

UNITED STATES PATENTS

| 2,969,211 | 1/1961 | Von Saurma | 102—4 X |
| 3,185,412 | 5/1965 | Rogallo | 244—49 |
| 3,228,634 | 1/1966 | Chakeian | 102—4 X |

OTHER REFERENCES

NASA Technical Note D-2044, page 13, December 1963.

SAMUEL W. ENGLE, *Primary Examiner.*

U.S. Cl. X.R.

244—46